Figure 1:
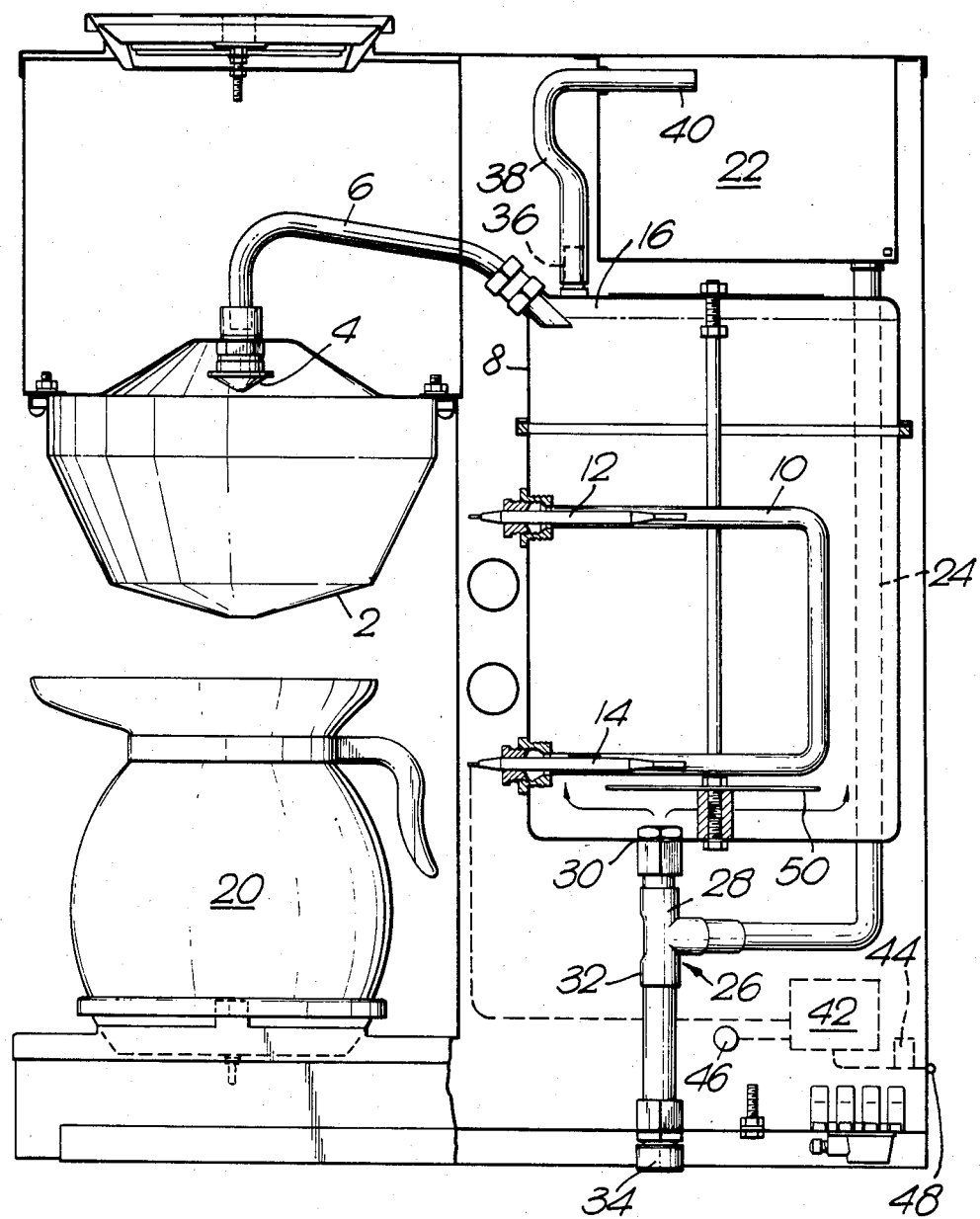

United States Patent [19]

Hayes

[11] Patent Number: 4,653,390
[45] Date of Patent: Mar. 31, 1987

[54] APPARATUS FOR MAKING TEA OR COFFEE

[75] Inventor: Cecil Hayes, Hastings, United Kingdom

[73] Assignee: W. M. Still & Sons Limited, United Kingdom

[21] Appl. No.: 768,023

[22] Filed: Aug. 21, 1985

[30] Foreign Application Priority Data

May 29, 1985 [GB] United Kingdom ............... 8513531

[51] Int. Cl.⁴ ............................................ A47J 31/057
[52] U.S. Cl. ........................................ 99/281; 99/285; 99/307; 219/297; 219/323
[58] Field of Search ............... 99/279, 280, 281, 283, 99/285, 290, 293, 294, 300, 304, 307; 219/297, 312, 323, 324

[56] References Cited

U.S. PATENT DOCUMENTS

| 4,464,981 | 8/1984 | Stover | 99/280 |
| 4,531,046 | 7/1985 | Stover | 99/281 X |
| 4,575,615 | 3/1986 | Shigenobu | 99/279 X |

*Primary Examiner*—Billy J. Wilhite
*Attorney, Agent, or Firm*—Wood, Herron & Evans

[57] ABSTRACT

A beverage brewing apparatus of the infusion type in which a hot water tank contains several infusion charges, the tank is connected at the top to a conduit extending to an infusion sprayer over a pan containing granular matter to be infused, replenishing water is supplied to the bottom of the tank and is used to force a top charge of water in the tank into the pan, a heater for the tank is controlled by a lower thermostat in the tank and an upper thermostat indicates when the top charge is at the correct temperature for infusion to take place. The arrangements ensure a ready supply of hot water for further infusions while reducing the instant power requirements for the heater.

8 Claims, 9 Drawing Figures

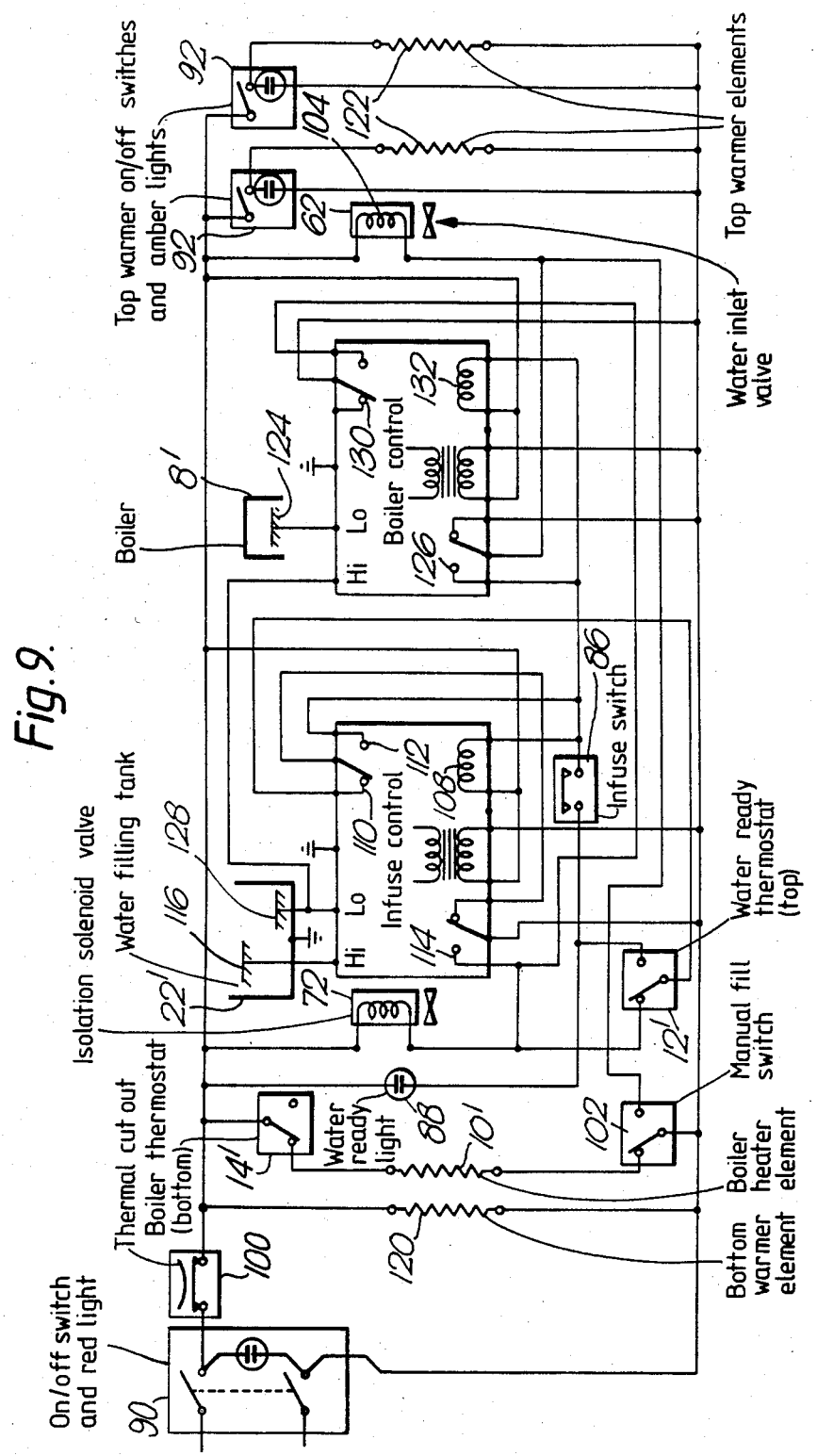

APPARATUS FOR MAKING TEA OR COFFEE

The present invention relates to coffee and/or tea brewing apparatus.

Brewing apparatus is known in which a quantity or charge of water is either manually or automatically fed into a heater tank to commence an infusion of coffee or tea, the charge being of an amount necessary for a single infusion. If a further infusion is required it is necessary to wait for the completion of the infusion and also to await a complete reheating of the contents of the re-charged heater tank. Whilst this operation is relatively fast when using a high powered heater, it is very slow when using a relatively low powered heater such as can be connected to normal domestic low power supplies such as 115 or 120 v, 15 amps as is available in North America.

An object of the invention is therefore to provide an apparatus capable of quickly providing a charge of hot water for a second or subsequent infusion operation(s).

Coffee and/or tea brewing apparatus according to the invention comprises an infuser pan and spray head arranged to fill a receptacle containing one infused charge, a hot water tank capable of holding a plurality of charges of water, each charge of water equivalent to one said infused charge, the tank connected via a conduit from the top of the tank to the spray head and heater means associated with the hot water tank, means for replenishing the hot water tank, a first thermostat at or adjacent the bottom of the tank arranged to detect the water temperature at the tank bottom, and a second thermostat at a distance below the top of the tank corresponding to a single said charge of water, the second thermostat being arranged to detect the water temperature of the top single charge of water.

Figure 2:
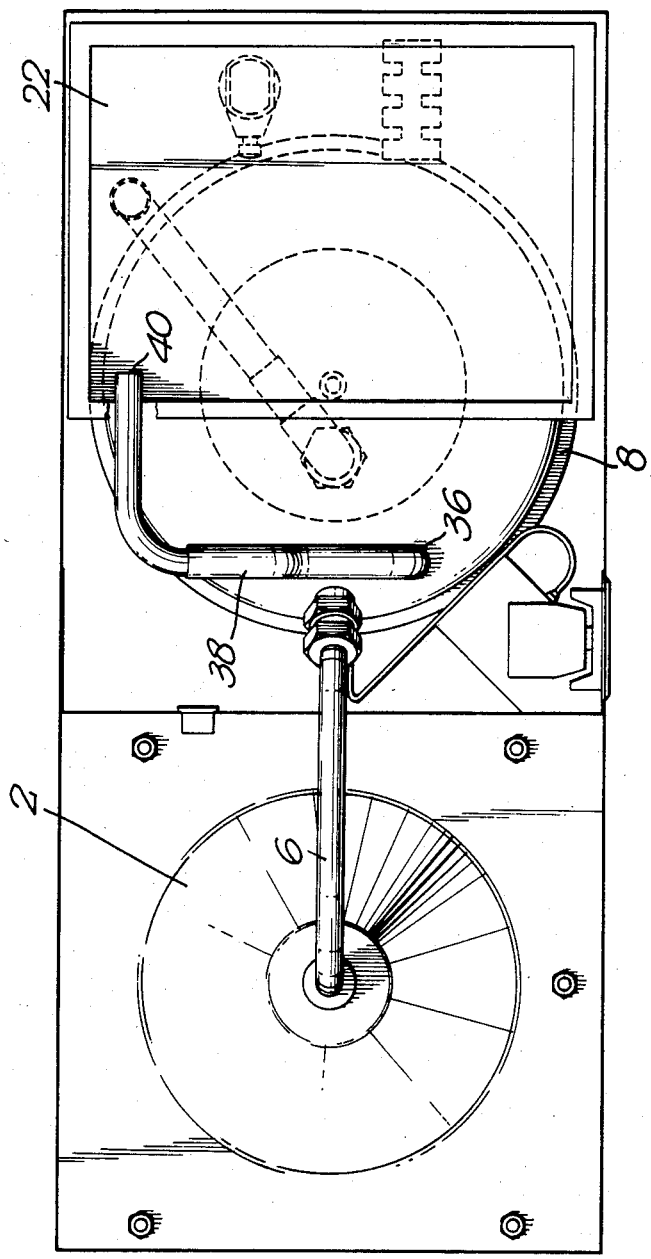
Figure 3:
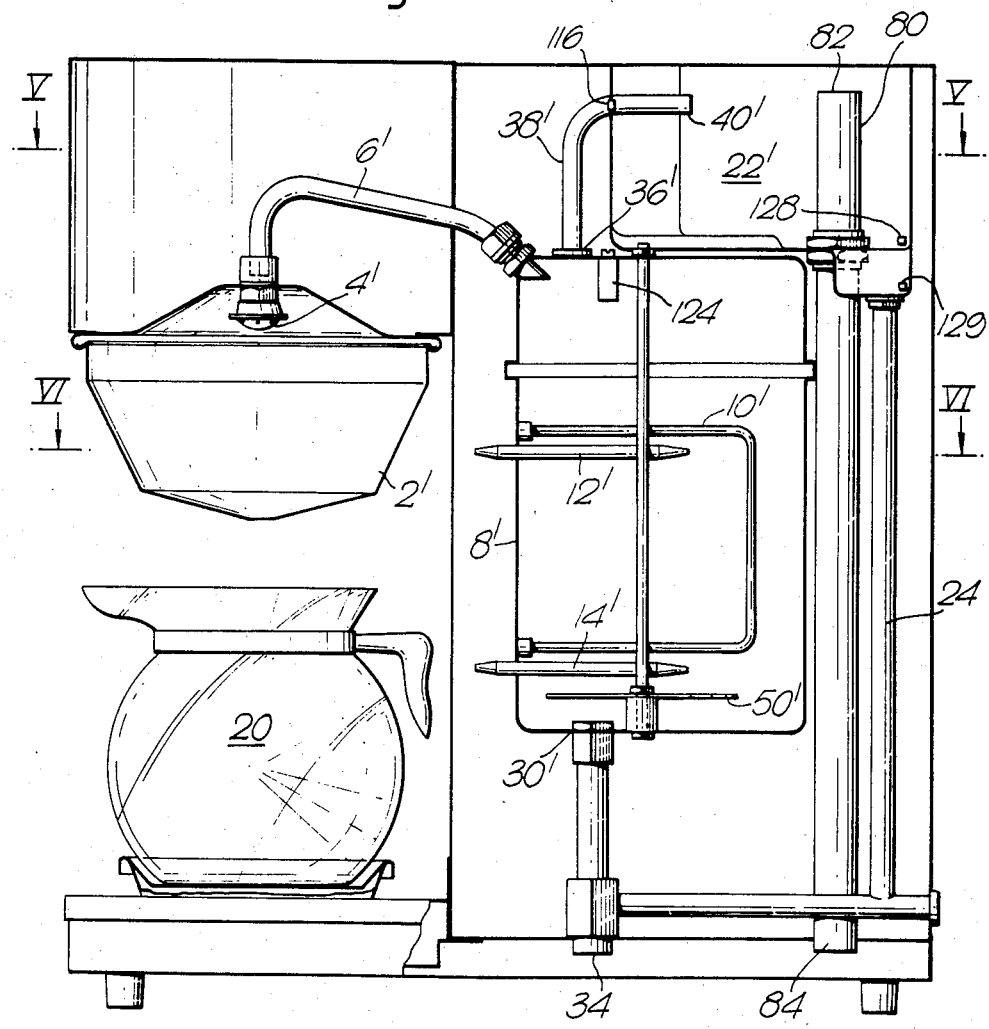
Figure 4:
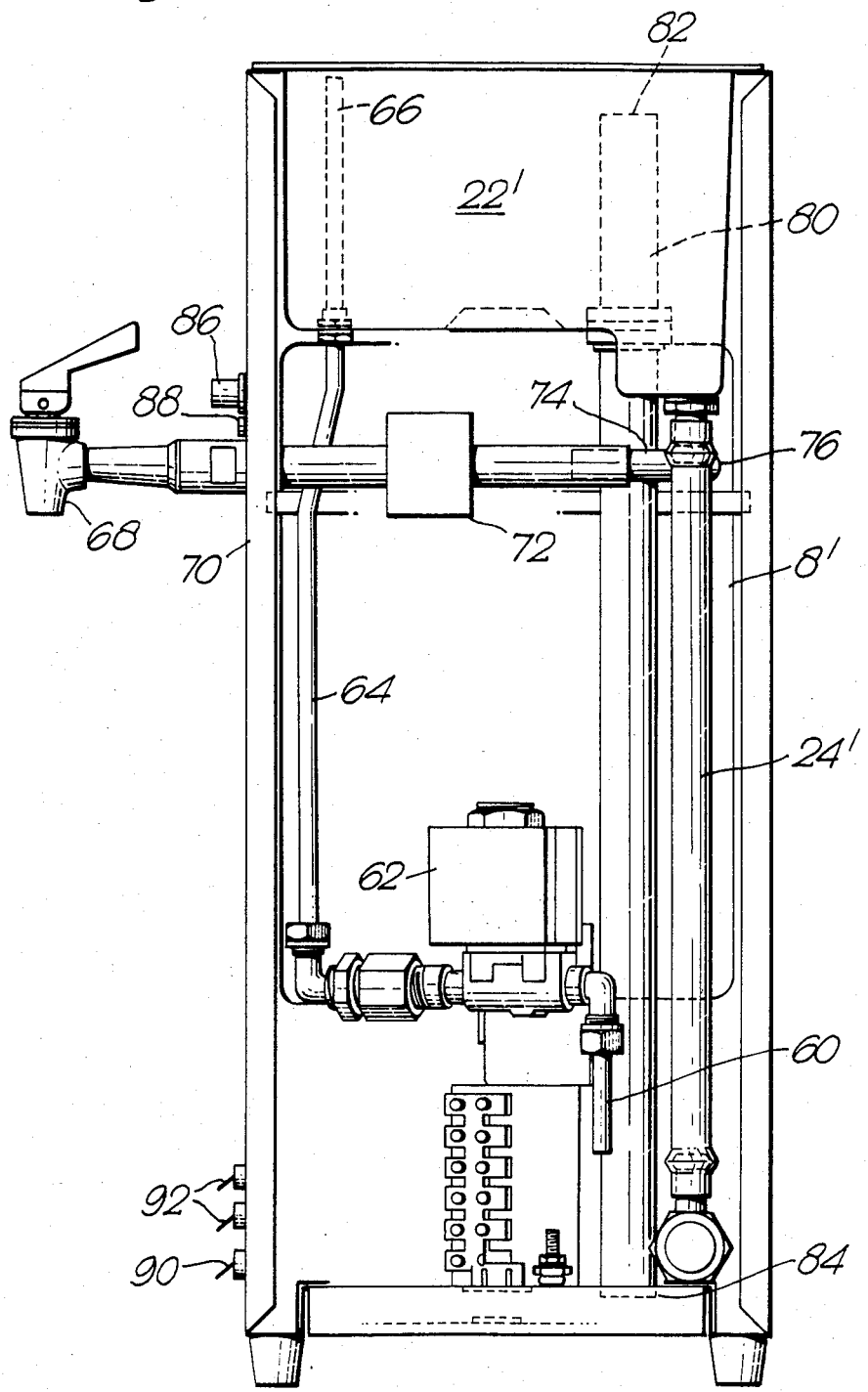
Figure 5:
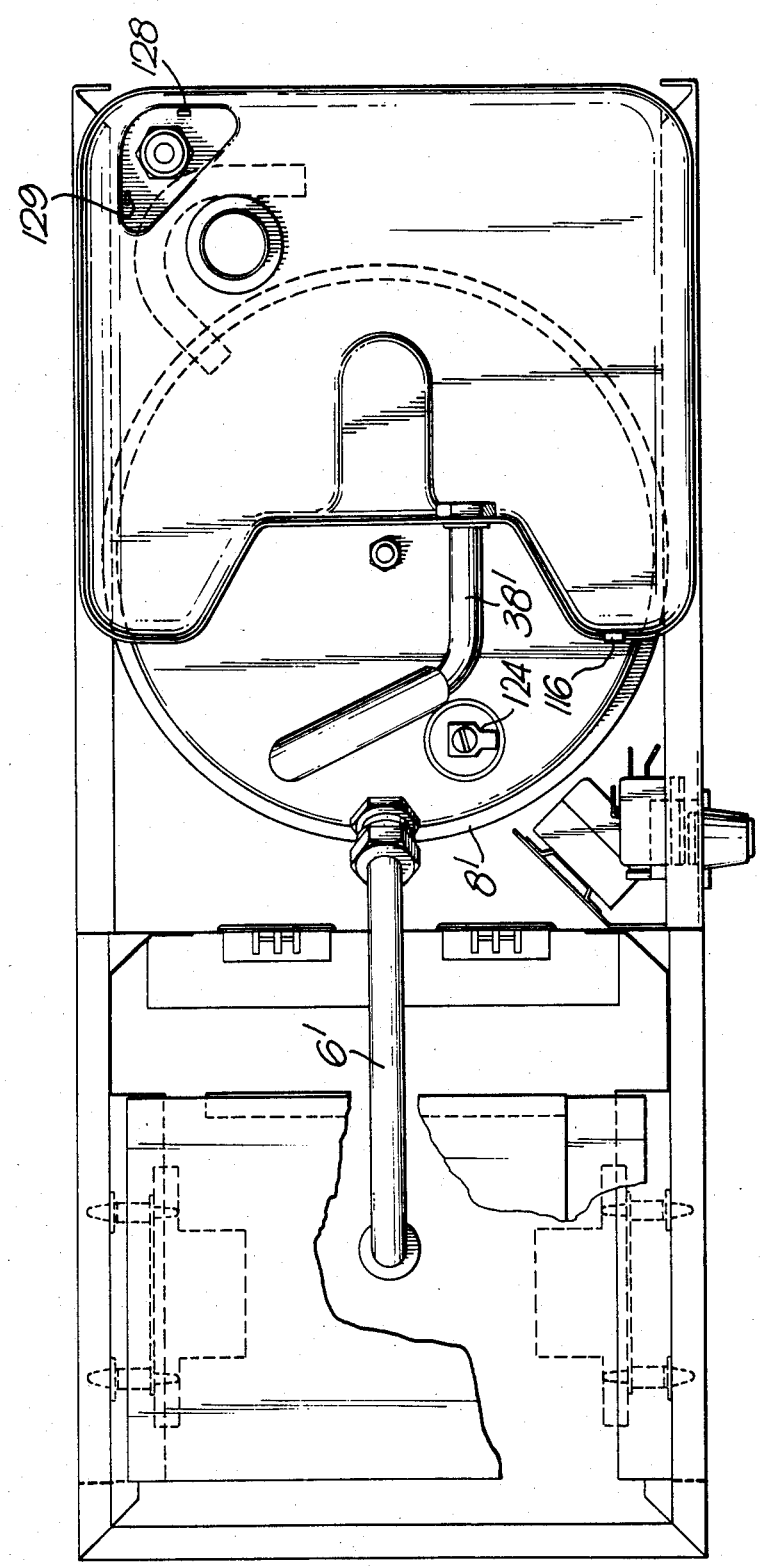
Figure 6:
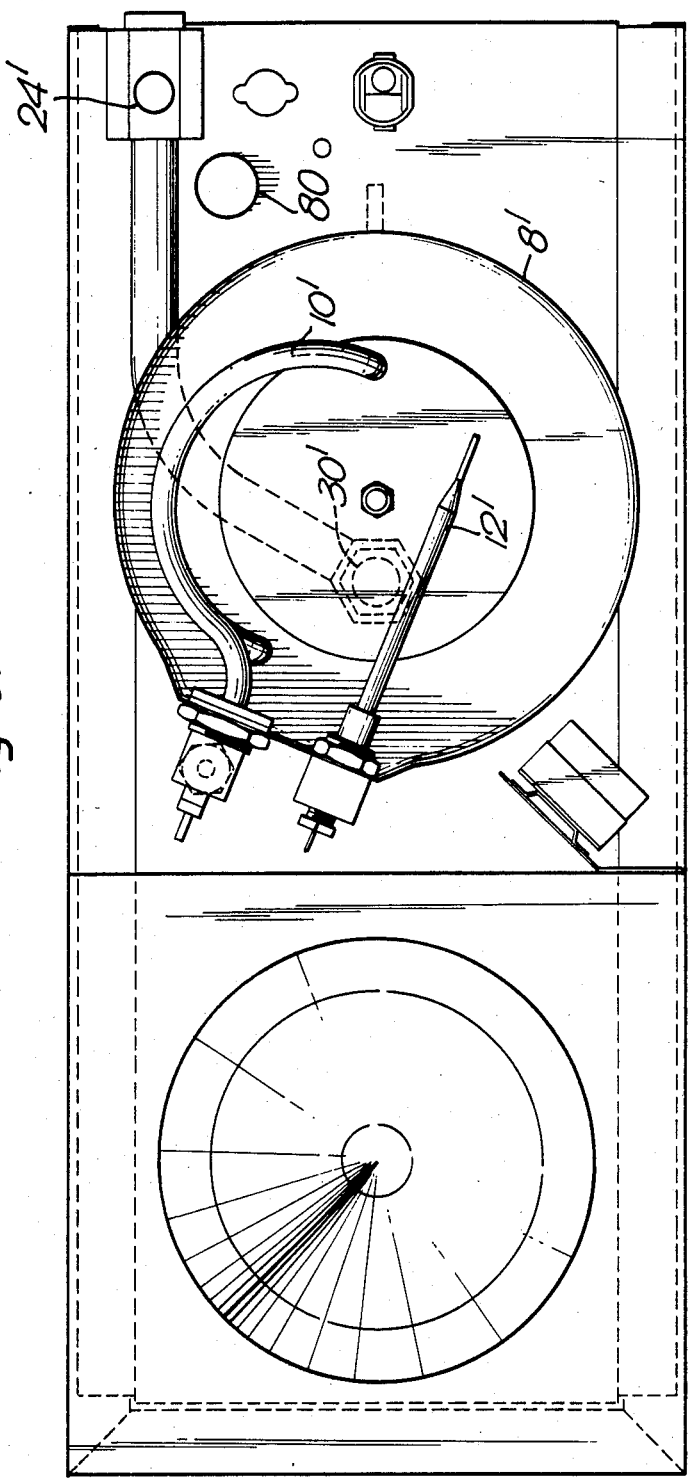
Figure 7:
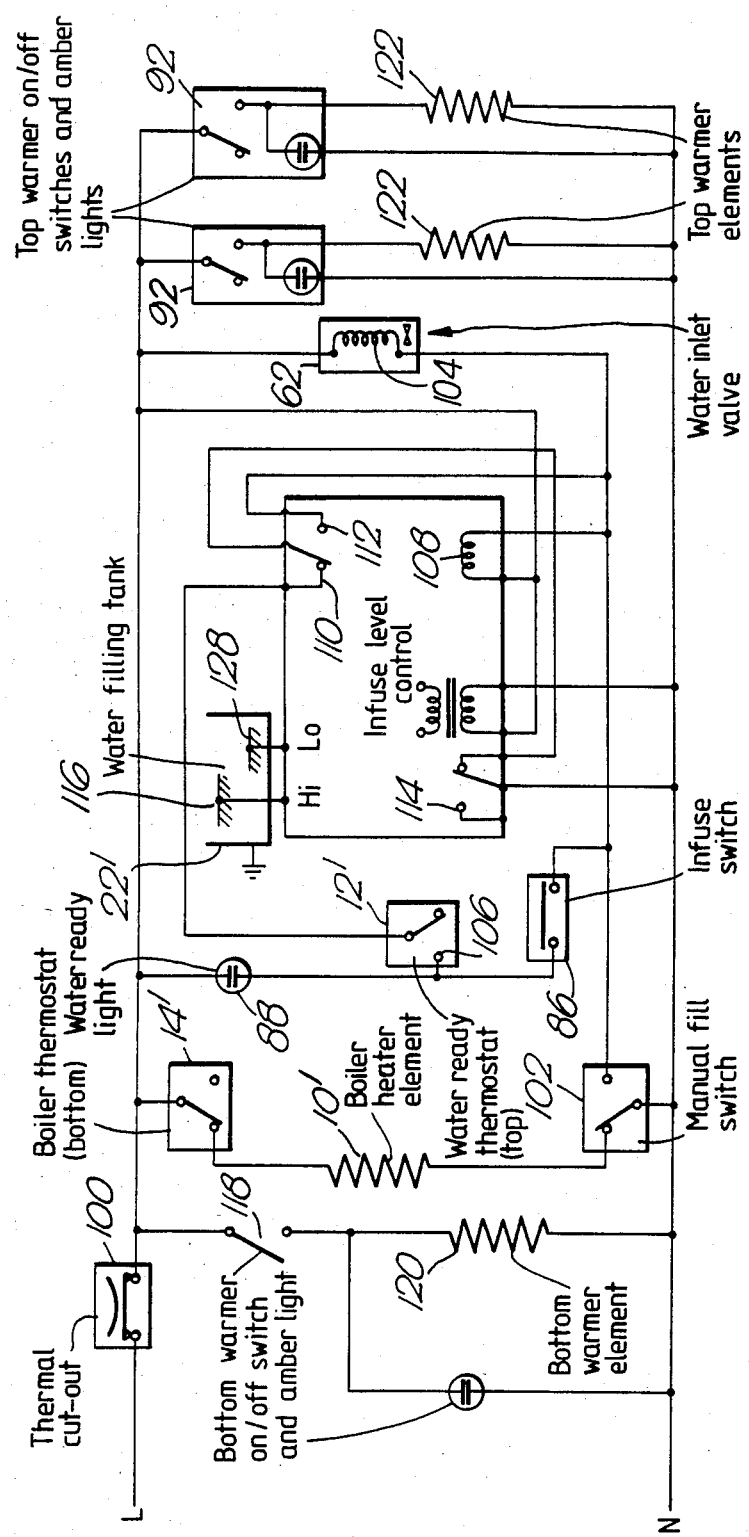
Figure 8:
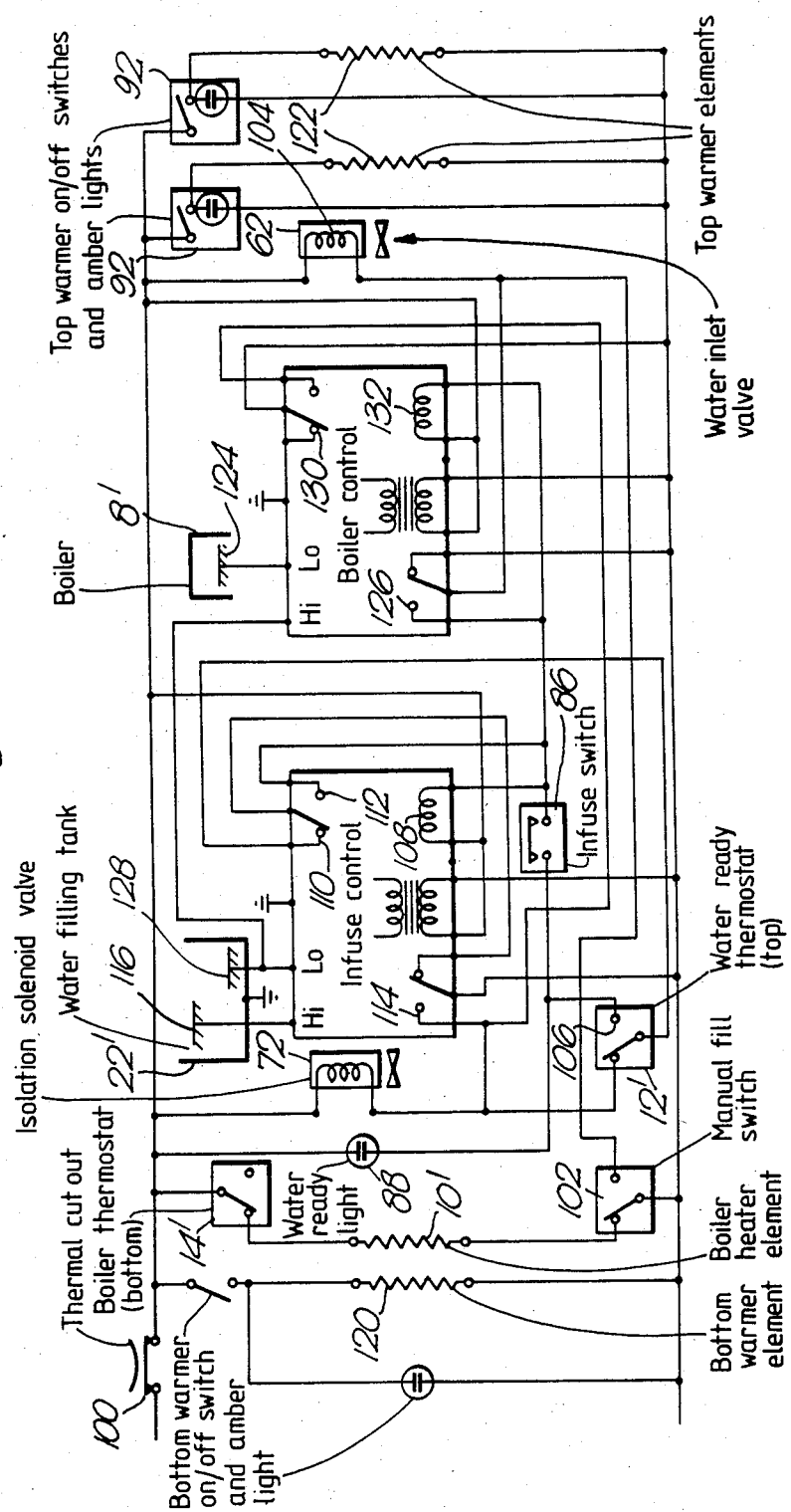

Embodiments of the invention will now be described by way of example with reference to the accompanying drawings in which:

FIG. 1 is a side sectional view of a manual brewing apparatus according to the invention, FIG. 2 is a top plan sectional view of the apparatus of FIG. 1, FIG. 3 is a side sectional view of an automatic brewing apparatus according to the invention, FIG. 4 is a rear view of the apparatus of FIG. 3, FIG. 5 is a top plan sectional view of the apparatus of FIG. 3 taken at V—V, FIG. 6 is a top plan sectional view of the apparatus of FIG. 3 taken at VI—VI, FIG. 7 is a circuit diagram for one version of the apparatus of FIG. 3 without a dispensing tap, FIG. 8 is a circuit diagram for the apparatus of FIG. 3 with a dispensing tap, and FIG. 9 is a modified circuit diagram for the apparatus of FIG. 3 with a dispensing tap.

The apparatus shown in FIGS. 1 and 2 is a manually filled brewing apparatus having an infuser pan 2, a spray head 4 and a conduit 6 leading from the spray head to the top of a hot water tank 8, the conduit 6 connecting as a siphon tube from the top of the tank. The tank 8 has a heater element 10, an upper thermostat 12 and a lower thermostat 14. Upper thermostat 12 is located about a third of the way down from the top 16 of the tank so as to measure the temperature (which when hot is between about 90° and 95° C.) and the top third of the volume of the tank is equivalent to a water charge for one infusion charge for receptacle 20 positioned below the infuser pan 2. Thermostat 14 is arranged to measure the water temperature at the bottom of the tank between about 92° and 97° C.

Above the tank 8 is a manual filler tank 22 connected via a conduit 24 to a T-junction 26, the upper leg 28 of which opens into an inlet 30 of the tank. The lower leg 32 of the T-junction extends downwards to a drain plug 34. At the top of the tank 8 is an air outlet 36 connected via a conduit 38 to an inlet 40 at the top of filler tank 22. A baffle plate 50 is provided above inlet 30 to divert the rising water during a filling operation away from the centre of the tank and maintain the water in the tank stratified, i.e., in distinct strata of hot and cold water zones.

The operation of the apparatus shown in FIGS. 1 and 2 is as follows:

The tank 8 is filled manually through tank 22 and the heater element 10 is switched on. As the temperature of the water rises, the hot water rises to the top of tank 8 until thermostat 12 indicates by means of water ready lamp 46 that the top of the tank has reached infusion temperature. At this state a first charge is ready for an infusion operation which is commenced by pouring an additional charge of water into filler tank 22. This water feeds into the bottom of the tank through conduit 30, displacing the hot water out of the top of the tank through conduit 6. Because of the baffle plate 50 the cold water entering the tank is encouraged to remain in a distinct strata at the bottom of the tank and therefore the amount of cold water mixing with the hot water is minimal and hence the temperature of the water at the top of the tank is kept high whilst the heater at the bottom of the tank brings the temperature of the cold strata up, in this way several infusions can be achieved in rapid succession depending on the size of the tank. The infused coffee or tea then percolates through the infuser pan into receptacle 20. The brewing apparatus is preferably left on so that the water in the tank 8 continues to heat up until thermostat 14 reaches a temperature of 92° to 97° C. and then by means of controller 42 cuts off power to heater element 10. FIGS. 3 to 6 show an automatically filled brewing apparatus having a similar hot water tank 8' infuser pan 2' with spray head 4' and tank to spray head connecting siphon conduit 6'. The tank also has an upper themostat 12' and lower thermostat 14' with heater element 10', a deflector plate 50' above inlet 30' and a vent 36' opening at 40' into a filler tank 22'.

The main difference between apparatus shown in FIG. 3 and that shown in FIG. 1 is the provision of a water means connection 60 leading to a water inlet solenoid valve 62 connected by conduit 64 to an inlet 66 in filler tank 22'. Filler tank 22' has an outlet conduit 24' connecting to heater tank inlet 30'. The water draw-off tap 68 on the side of the casing 70 of the apparatus is connected via an isolation solenoid valve 72 to a conduit 74 connected in turn to a water outlet 76 in the top third of tank 8'.

An emergency overflow pipe 80 provides an emergency outlet 82 from the filler tank 22' to vent through the apparatus to an outlet 84 below the apparatus. This is in case of failure of valve 62 remaining open so that water can overflow through the apparatus without damaging any electrical equipment.

An infusion switch 86 and water ready lamp 88 are mounted on the side of casing 70. A machine on/off switch 90 and top heater switch or switches 92 are also mounted on side of casing 70. The circuit diagram for an automatic brewing apparatus without a side water draw-off tap is shown in FIG. 7 and includes a thermal cut-out 100 which operates to disconnect the electrical supply to the main heater 10' if the apparatus overheats.

When the apparatus is first to be filled with water a manual fill switch 102 is moved from the position shown in FIG. 7 to make a circuit through the solenoid 104 of the water inlet valve 62 so that this is opened allowing water from the mains supply to enter the filler tank 22' until the apparatus is full. The fill switch 102 is then moved to the position shown in FIG. 7. In this position the main boiler heater element 10' is energised through the bottom thermostat 14' to heat the water in the tank. When the water in the upper portion of the tank above the probe of the upper thermostat 12' has been heated to the desired temperature, the thermostat 12' operates from the position shown in FIG. 7 to make with the contact 106. The water ready light 88 is then lit showing that an infusion operation may take place.

When the infuse switch 86 is momentarily closed, the relay 108 is energised moving the swith 110 from the contact shown to a second contact 112. When in this position the relay 108 is energised through the connection 112 to keep the switch in that operative position. The solenoid 104 is then operated through the switch 110 and a further switch 114 to open the water inlet valve to allow water to enter the water filling tank from the mains. Infusion then takes place until the water level reaches the high level probe 116 in the water filling tank whereupon the switch 114 is operated to open the connection between the solenoid 104 and the neutral line thus closing the water inlet valve 62.

When the whole tank has reached the desired water temperature, the bottom thermostat 14' operates to de-energise the boiler heater element 10'.

Manual switch 118 is provided to energise a bottom warmer element 120. Heating elements 122 for the top warmer elements are energised on closure of switches 92.

The infusion switch 86 cannot be operated to open the water inlet valve until the water ready light 88 is lit and able to pass current. Hence, coffee infusion cannot take place until the water is at the desired temperature.

It will of course be appreciated that a mains on/off switch for the boiler heating element may be provided if desired.

The wiring diagram illustrated in FIG. 8 is similar to that described with reference to FIG. 7 except that it illustrates the apparatus with a side water draw-off tap.

When the water in the top portion of the boiler tank is being heated to the desired temperature, a tap isolation valve 72 remains closed with the solenoid energised, the circuit being made through the top thermostat 12', the relay switch 110 and the level switch 114. When the top thermostat 12' is operated to make the circuit through the water ready lamp 88 then the circuit through the solenoid of the valve 72 is broken at the top thermostat, and the valve 72 is opened allowing hot water to be drawn off from the tap. When the thermostat 12' operates to change the switch 106 because the water in the top portion of the boiler tank has dropped below the required temperature, then the valve 72 again closes.

When water is being drawn off through the tap, the water level drops below a level probe 124 located in the top of the boiler between the point of take off for the spray head and the point of take off for the tap. When the water level dropps below this probe, a switch 126 moves so as to complete the circuit through the solenoid 104 of the water inlet valve 62 so as to open this valve. Water then enters the apparatus until the level reaches the low water probe 128 in the water filling tank which operates the switch 126, where upon the ciruit to the water inlet valve 62 is made by causing the water supply to be shut off.

When the infusion switch 86 is pressed the isolation solenoid valve 72 is closed by the hold-on switch 130 by operation of the coil 132 within the boiler control unit. This prevents water from being drawn off through the tap during infusion of coffee or tea. A two-pole on-off switch 90 with indicator lamp may be provided (see FIG. 9).

We claim:

1. Apparatus for brewing a beverage such as coffee or tea comprising an infuser pan arranged to fill a receptacle containing at least one infused charge,
   a spray head above said pan to sprinkle hot water onto said pan,
   a hot water tank having a top and bottom and capable of holding a plurality of charges of water, each charge of water equivalent to one said infused charge,
   said tank connected by means of a first conduit to said spray head,
   said conduit extending from a position in said tank adjacent the top of said tank,
   heater means associated with said tank adapted to heat water in said tank,
   means for replenishing said tank with water,
   a first thermostat in the region of the bottom of said tank arranged to detect water temperature in said tank bottom,
   a second thermostat in a region of said tank below said tank top at a distance below said tank top corresponding to a single said charge of water arranged to detect water temperature of said top single charge of water,
   water ready indicator means associated with said second thermostat and control means connected between said first thermostat and said heater means to control power to said heater means.

2. Apparatus as claimed in claim 1 wherein said replenishing means comprises a filler tank mounted above said hot water tank, said filler tank arranged for manual filling and connected via a second conduit to said tank bottom.

3. Apparatus as claimed in claim 2 wherein a third conduit extends from said hot water tank top to said filler tank.

4. Apparatus as claimed in claim 1 wherein said replenishing means comprises a water supply, a water inlet valve connected to said supply, a filler tank mounted above said hot water tank, a third conduit extending from said valve to said filler tank, said filler tank connected via a second conduit to said hot water tank bottom, water level detection means in said hot water tank to detect water level drop below the hot water tank top and water level detection means in said filler tank to detect water level rise in said filler tank corresponding to a level where said hot water tank is full, said two water level detection means connected to control means controlling said water inlet valve to maintain said hot water tank in a water full replenished condition.

5. Apparatus as claimed in claim 4 wherein said filler tank is provided with an overflow conduit having a conduit inlet toward the top of said filler and an outlet at the bottom of said apparatus.

6. Apparatus as claimed in claim 4 wherein said filler tank is provided with further water level detection means in a bottom portion of said filler tanks at a level below said other filler tank level detection means.

7. Apparatus as claimed in claim 1 comprising an infuse switch means and an infuse control means, said infuse control means controlling said replenishing means in cooperation with said second thermostat so that when the charge of water in the upper region of said hot water tank reaches the desired temperature and after operating said infuse switch means said replenishing means allows water entering the bottom of the hot water tank to force water from the hot water tank top along said first conduit to said spray head.

8. Apparatus as claimed in claim 7 wherein said infuse switch means comprises an infuse press button and a hold-on circuit.

* * * * *